UNITED STATES PATENT OFFICE.

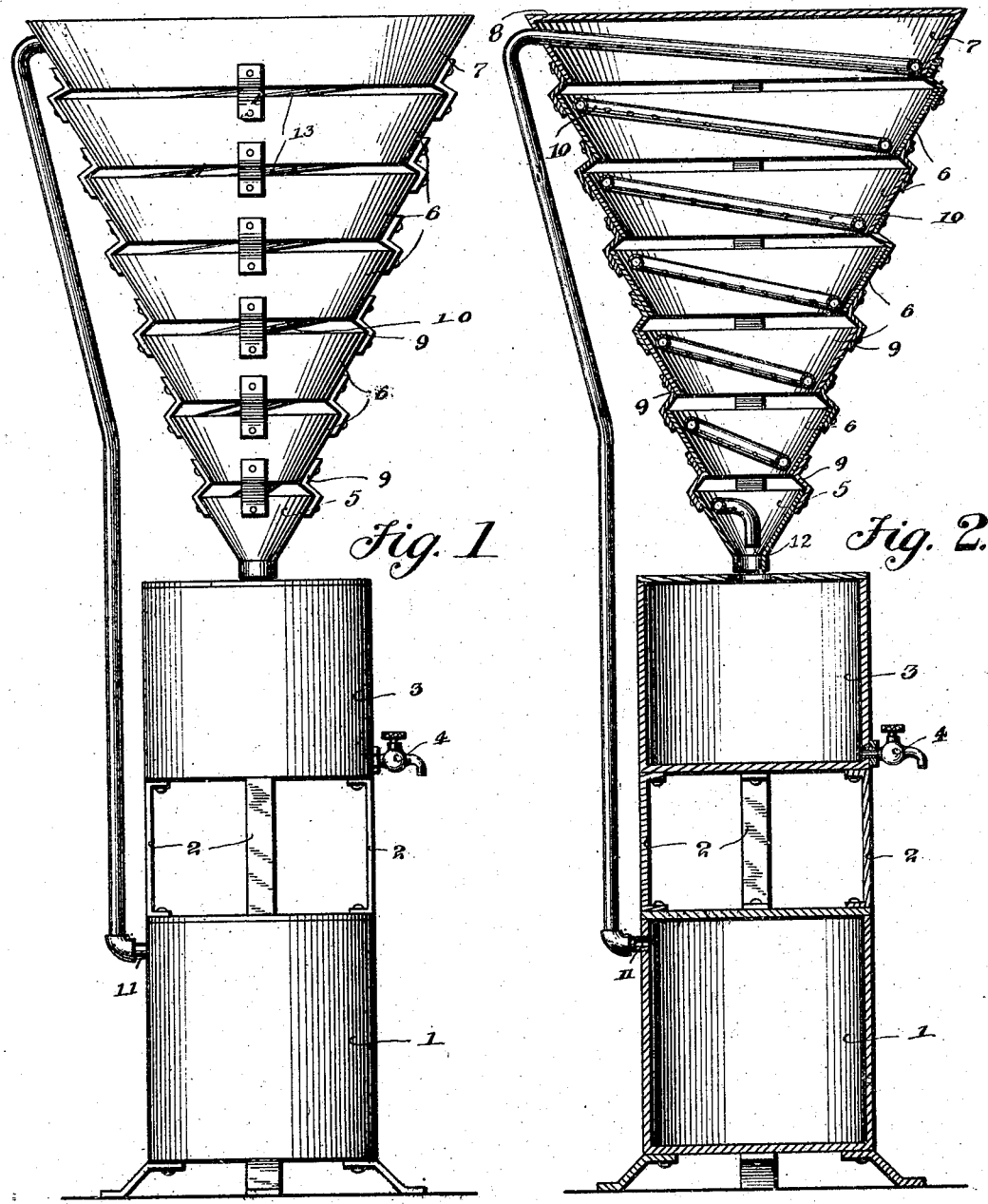

VALDEMAR G. MELLGREN, OF TOMBSTONE, ARIZONA.

WATER-DISTILLER.

1,237,079.  Specification of Letters Patent.  Patented Aug. 14, 1917.

Application filed August 16, 1916.  Serial No. 115,340.

*To all whom it may concern:*

Be it known that I, VALDEMAR G. MELLGREN, a citizen of the United States, residing at Tombstone, in the county of Cochise and State of Arizona, have invented new and useful Improvements in Water-Distillers, of which the following is a specification.

This invention relates to a combined steam generator and condenser by means of which in a very convenient manner, water may be filtered.

The object of the invention is to provide a simple construction having a large heat radiating property so that steam in a portion of its travel may be instantly condensed.

Besides the above my invention is distinguished in the use of a plurality of cone sections inclosing a worm, the convolutions of which are subjected to air currents passing between the sections.

With these and other objects in view the invention will be better understood from the following detailed description taken in connection with the accompanying drawing, wherein—

Figure 1 is a side elevation of the invention, and

Fig. 2 is a vertical sectional view.

Referring to the drawing the numeral 1 designates a boiler in which steam is generated. Mounted above the boiler 1 by means of the legs 2 is a water receptacle 3 having a spigot 4. Centrally arranged within the top of the receptacle 3 is a funnel 5 and secured to this funnel and superimposed one above the other is a plurality of cone sections 6 increasing in diameter toward the top cone 7 that has a solid top 8. These sections are held in spaced relation to each other by means of cleats 9. A worm 10 is arranged with its convolutions in close proximity to the interior surface of the sections, and has its inlet end 11 communicating with the boiler 1 and its outlet end 12 terminating directly above the funnel 5.

The worm at spaced intervals is formed with apertures 13 through which steam passes to be acted on by the condensing action of the sections and the air currents passing between the sections.

From the foregoing description it will be seen that steam generating in the boiler 1 will pass into the worm from whence it will escape by means of the apertures. The steam in escaping from the apertures strikes upon the interior surface of the sections where it is condensed and the resulting liquid drips down from one section to the other until passing into the receptacle 3 by means of the funnel 5.

At this point I wish to call attention to the fact that the liquid when dripping from the small end of one of the sections into the adjacent lower section is subjected to air current with the result that the temperature of the liquid is materially reduced and thus the temperature of the section brought into contact with this liquid will be lowered. This dripping of the liquid from one section to another also condenses any steam tending to pass between the sections into the atmosphere.

Having described my invention, what I claim is:

1. A steam generator and condenser comprising a steam boiler, a water receptacle mounted above said boiler, a worm communicating with said receptacle and boiler, and a casing inclosing the worm and formed with slots between the convolutions of the worm.

2. A steam generator and condenser comprising a steam boiler, a water receptacle mounted above said boiler, a worm communicating with said receptacle and boiler, and a cone shaped casing inclosing the worm and composed of superimposed spaced sections.

3. A steam generator and condenser comprising a steam boiler, a water receptacle mounted above said boiler, a worm communicating with said receptacle and boiler, and a plurality of superimposed spaced cone sections, the small end of one section being arranged opposite the large end of an adjacent section, said worm having its convolution arranged in close proximity to the interior surface of the sections.

In testimony whereof I affix my signature.

VALDEMAR G. MELLGREN.

Witnesses:
 JACK STEPHENS,
 J. L. MELLGREN.

Copies of this patent may be obtained for five cents each, by addressing the "Commissioner of Patents, Washington, D. C."